Aug. 11, 1959 W. M. GOODALL ET AL 2,899,508

BROAD-BAND AMPLIFIER EMPLOYING PARALLEL-SERIES COUPLING NETWORK

Filed July 1, 1954 3 Sheets-Sheet 1

INVENTORS W. M. GOODALL
H. E. ROWE
BY
Alan C. Rose
ATTORNEY

Aug. 11, 1959 W. M. GOODALL ET AL 2,899,508

BROAD-BAND AMPLIFIER EMPLOYING PARALLEL-SERIES COUPLING NETWORK

Filed July 1, 1954 3 Sheets-Sheet 2

INVENTORS W. M. GOODALL
H. E. ROWE
BY Alan C. Rose
ATTORNEY

BROAD-BAND AMPLIFIER EMPLOYING PARALLEL-SERIES COUPLING NETWORK

Filed July 1, 1954 3 Sheets-Sheet 3

INVENTORS W. M. GOODALL
H. E. ROWE
BY Alan C. Rose
ATTORNEY

United States Patent Office 2,899,508

Patented Aug. 11, 1959

2,899,508

BROAD-BAND AMPLIFIER EMPLOYING PARALLEL-SERIES COUPLING NETWORK

William M. Goodall, Oakhurst, and Harrison E. Rowe, Red Bank, N.J., assignors to Bell Telephone Laboratories, Incorporated, New York, N.Y., a corporation of New York Application July 1, 1954, Serial No. 440,614

6 Claims. (Cl. 179—171)

This invention relates to vacuum tube amplifiers, and, more specifically, to broad-band, high gain, amplifiers.

As is known in the art, the product of the gain and the bandwidth attainable with a vacuum tube is primarily a function of the transconductance and the total capacitances of the tube. More specifically, the figure of merit is directly proportional to the transconductance $g_m$ of the tube, and inversely proportional to the square root of the product of the output and input capacitances $C_1$ and $C_2$. The figure of merit expressed in mathematical terms is therefore equal to $$K=\frac{g_m}{\sqrt{C_1C_2}}$$

where K is a constant. Recent efforts have been directed toward increasing the figure of merit of vacuum tubes by decreasing the spacing between the grid and cathode elements. Despite the increased input capacitance caused by the reduced grid-to-cathode spacing, the transconductance of a tube is increased to such an extent that the figure of merit is significantly increased. Further increase in the figure of merit has been obtained by reducing the output capacitance of the tubes. For example, in application Serial No. 316,744 of C. T. Goddard and N. C. Wittwer, Jr., filed October 24, 1952, now Patent 2,747,138, granted May 22, 1956, the plate capacitance was substantially reduced by connecting an inductance directly to the plate and physically locating the inductance next to the plate.

In the use of these new tubes it has previously been proposed to employ the matched and mismatched parallel-parallel interstage coupling networks which are customarily used with the older types of tubes. However, when employed with the new tubes, in broad-band circuits, the gain of the parallel-parallel interstage network may be insufficient, and the gain versus frequency response may be dependent on the level of the input signal when automatic gain control is employed. In addition, certain complex filter networks have been suggested for use with the new tubes. These filter networks, however, generally involve too many circuital elements to be economically practical.

Accordingly, the principal object of the present invention is to increase the bandwidth and to simplify interstage coupling networks for the new tubes which have a high figure of merit.

In accordance with the present invention, it has been discovered that an amplification stage employing a doubly tuned interstage coupling network having a parallel tuned primary and a series tuned secondary, when used with the new type of vacuum tube having a high figure of merit, has a greater bandwidth and yields more gain than any known network which uses as few circuit elements. More specifically, and in accordance with an embodiment illustrated in the drawings, the parallel-series tuned interstage coupling network may advantageously be realized as a T network of inductances resonant with the low output plate capacitance and the high input grid capacitance of the coupled tubes. In addition, a relatively large resistance connected to the grid of the second tube provides series loading for the series tuned circuit loop, and serves to stabilize, and to improve the gain characteristics of the amplification stage.

The invention will be more readily understood by referring to the following descriptions taken in conjunction with the accompanying drawings and forming a part thereof, in which.

Figure 4A:
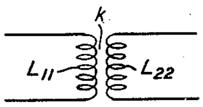
Figure 4B:
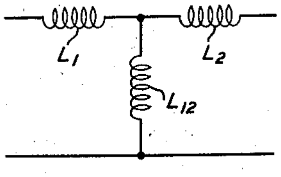
Figure 9:
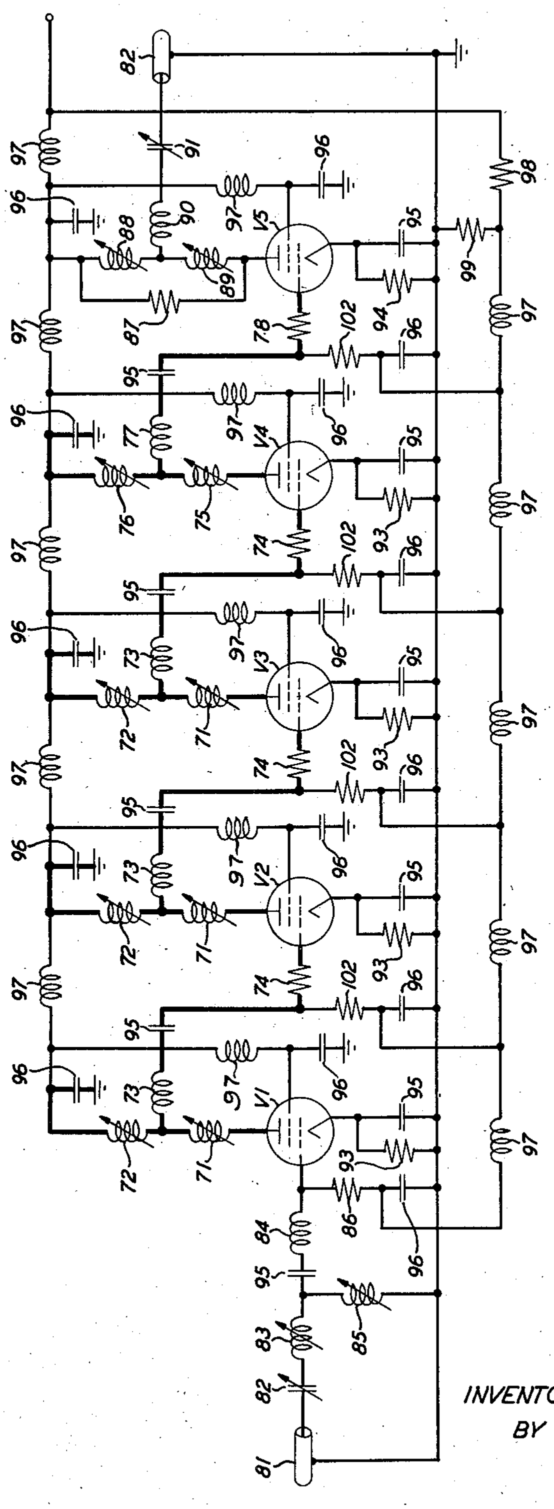
Figure 10:
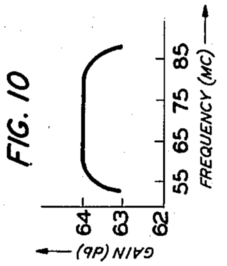

Figs. 4–A and 4–B are employed in discussing the transformation from a transformer to a T network of inductances;

Figs. 5 through 8 are plots of various circuit parameters which are useful in analyzing the behavior of the present interstage circuits;

Fig. 9 is a schematic diagram of a five-stage amplifier employing the principles of the present invention; and Fig. 10 is a plot of the gain versus frequency of the amplifier of Fig. 9.

Figure 1:
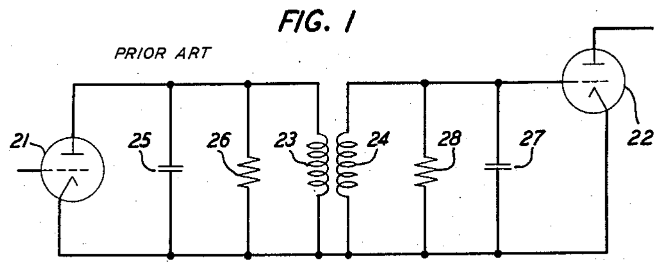
Fig. 1 is an interstage coupling network of the prior art.

Referring more particularly to the drawings, Fig. 1 illustrates a typical intermediate frequency amplifier of the prior art, which is included in the present application for purposes of comparison. The tubes 21 and 22 of this circuit are commercially available triodes or tetrodes in which the input to output capacitance ratio is unity or perhaps two. The interstage coupling network includes a transformer having a primary 23 and a secondary 24. The primary winding 23 is tuned with the capacitance 25 which may include external capacitance in addition to the output capacitance of the tube. The damping resistance 26 is in parallel with the primary winding 23 and the capacitance 25. The parallel tuned secondary also includes the capacitance 27 and a resistance 28. With the output capacitance of the many amplification tubes being substantially the same as their input capacitance, matched parallel-parallel circuits of the type illustrated in Fig. 1 have become standard for many applications. Certain variations of this circuit have, of course, been employed. These include placing most of the resistive loading in one or the other of the two tuned circuits. The electrical characteristics of these matched and mismatched parallel-parallel interstage coupling networks will be compared with the present parallel-series coupling network hereinafter.

Figure 2:
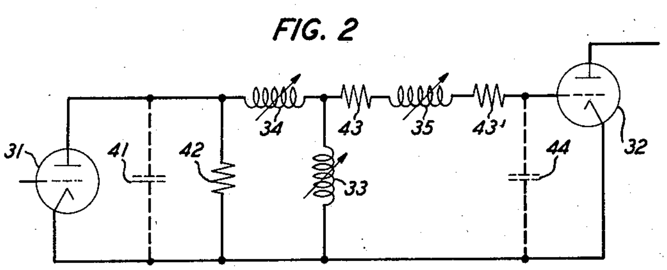
Figs. 2 and 3 are circuit diagrams showing parallel series interstage coupling networks in accordance with the present invention.

Fig. 2 shows by way of example, and for purposes of illustration, a parallel-series interstage coupling network in accordance with the invention. The tubes 31 and 32 which are employed in this circuit are of the new type mentioned hereinbefore, in which the figure of merit is much higher than that of tubes 21 and 22 of Fig. 1. The efforts toward increasing the figure of merit has resulted in increased input and decreased output capacitance to such an extent that the input to output capacitance ratios of the new tubes are 4 to 6 or higher as contrasted with the capacitance ratios of 1 or 2 which have been common in the past. In order to fully realize the potentialities of these new tubes, an interstage coupling circuit employing coupled parallel and series tuned circuit loops has been developed. As illustrated in Fig. 2 this circuit includes a T network of inductances 33, 34 and 35. The low output capacitance 41 of the tube 31 is parallel tuned with the inductances 33 and 34, and the loading resistance 42 is in parallel with the output capacitance 41. Another tuned circuit includes the series combination of the inductances 33 and 35, the resistances 43 and 43', and the relatively large input capacitance 44 of the tube 32.

The parallel tuned circuit associated with the output of the tube 31 and the series tuned circuit associated with the input of the tube 32 are coupled through the common inductance 33.

Figure 3:
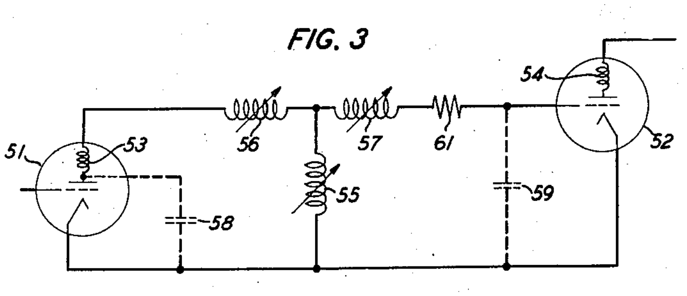

An alternative "parallel series" interstage coupling circuit is illustrated in Fig. 3. In this arrangement, the tubes 51 and 52 are of the type disclosed in the above-identified application of C. T. Goddard and N. C. Wittwer in which inductances 53 and 54 are located within the envelopes of the tubes 51 and 52, respectively, immediately adjacent the anodes of the tubes, to minimize their output capacitance. A T network of inductances 55, 56 and 57 is again employed, with the inductance 56 supplementing the isolating inductance 53. The inductance 56 may, of course, be eliminated when the built-in isolating inductance 53 is of the proper value. The low output capacitance of the tube 51 is indicated by the capacitance 58, and the relatively high input capacitance of the tube 52 is indicated at 59. The circuit of Fig. 3 is substantially the same as that of Fig. 2 with the exceptions of the isolating coil 53 within the tube 51 as mentioned above, and the fact that the loading is confined to the series side of the coupling circuit. The resistance 61, which is in series with the inductances 55 and 57 and the input capacitance 59 of the tube 52, constitutes the entire loading of the interstage circuit.

The values of the inductances and resistances of Figs. 2 and 3 may be derived on a mathematical basis which will first be considered broadly and then will be developed in considerable detail. First, an expression is developed for gain versus frequency for the coupling network. Then, the first three derivatives of this expression are set equal to zero to obtain the so-called "maximally flat" condition. With the selection of the tubes fixing the capacitances, the inductances and resistances of Figs. 2 and 3 may be determined from the equations derived as noted above, once the desired bandwidth is fixed.

In the course of the mathematical analysis, the parallel-series circuit of Figs. 2 and 3 will be contrasted with parallel-parallel circuits of the general type illustrated in Fig. 1, and their relative advantages and disadvantages will be disclosed. It will be shown that the parallel-series arrangement is advantageous for use with tubes having high capacitance ratios, and for broad bandwidths.

For simplicity, the calculations are initially carried out for the case of a symmetrical transformer. An impedance transformation is then made on the network to generalize the results to a dissymmetrical transformer and an arbitrary capacity ratio.

Proceeding to sketch out the mathematical analysis of the present circuits, the following table defines some of the important symbols:

$f$=frequency
$f_m$=midband frequency
$\omega=2\pi f$, which is the angular frequency in radians per second.
$\omega_m=2\pi f_m$
$f^*=f/f_m=\omega/\omega_m$
$F=f^{*2}$
$b_1=\omega_m C_1$ which is the susceptance of first capacitance at midband frequency.
$b_2=\omega_m C_2$ which is the susceptance of second capacitance at midband frequency.
$x=\omega_m L_{11}=\omega_m L_{22}$, considering initially a symmetrical transformer
$h_1=x/R_1$ which corresponds to the "Q" of the primary with the secondary open.
$h_2=x/R_2$, which corresponds to the "Q" of the secondary with the primary open.
$k$=coupling coefficient of transformer $L_{11}$, $L_{22}$
$s=1-k^2$, which is the leakage coefficient
$L_{12}=k\sqrt{L_{11}L_{22}}$, which is the mutual inductance of the transformer
$p_1=b_1x$
$p_2=b_2x$ Thus, we have:

$$\omega C_1=b_1f^* \qquad \omega C_2=b_2f^*$$

$\omega L_{11}=\omega L_{22}=xf^*$, considering a symmetrical transformer $$p_1=(f_m/f_1)^2,\ p_2=(f_m/f_2)^2$$

where $f_1$ and $f_2$ are the resonant frequencies of the primary and secondary when the two circuits are decoupled from each other.

The admittance of the coupling network is given by the expression:

$$y_t=\frac{I_{in}}{E_{out}} \tag{1}$$

where $I_{in}$ is the input current and $E_{out}$ is the output voltage.

Now for convenience let $$W=(kxy_t)^2 \tag{2}$$

Then we find:

$$W=D_3F^3+D_2F^2+D_1F+D_0+D_{-1}F^{-1} \tag{3}$$

where $$D_3=s^2p_1^2p_2^2 \tag{4}$$

$$D_2=s^2h_1^2p_2^2+\frac{p_1^2p_2^2}{h_2^2}-2sp_1^2p_2-2sp_1p_2^2 \tag{5}$$

$$D_1=-2sh_1^2p_2-2sp_2^2\frac{h_1}{h_2}-2\frac{p_1p_2^2}{h_2^2}+p_1^2+p_2^2+p_2^2\frac{h_1^2}{h_2^2}+2p_1p_2+2p_2^2\frac{h_1}{h_2}+2sp_1p_2 \tag{6}$$

$$D_0=h_1^2+\frac{p_2^2}{h_2^2}-2p_1-2p_2 \tag{7}$$

$$D_{-1}=1 \tag{8}$$

Now, considering the circuit as an interstage network driven by a tetrode or pentode with a transconductance $g_m$ and an applied grid voltage $E_{in}$, $$I_{in}=g_mE_{in} \tag{9}$$

Letting A be the voltage gain from the grid of the first tube to the grid of the second, $$A=\frac{E_{out}}{E_{in}} \tag{10}$$

combining with Equation 2, $$A^2=\left(\frac{E_{out}}{E_{in}}\right)^2=\frac{(g_mkx)^2}{W} \tag{11}$$

To obtain a "maximally" flat gain versus frequency characteristic it is required that the first three derivatives of $A^2$ with respect to F be zero at the band center, where $F=1$. This requirement may be stated as follows:

$$\frac{dW}{dF}=\frac{d^2W}{dF^2}=\frac{d^3W}{dF^3}=0,\ F=1 \tag{12}$$

Applying the above conditions to Equations 3 through 8, $$3D_3+2D_2+D_1-D_{-1}=0 \tag{13}$$

$$6D_3+2D_2+2D_{-1}=0 \tag{14}$$

$$6D_3-6D_{-1}=0 \tag{15}$$

Solving these equations, these results are obtained:

$$D_3=D_{-1}=1 \tag{16}$$

$$D_2=-4 \tag{17}$$

$$D_1=6 \tag{18}$$

From Equations 3, and 16 through 18, the following expressions may be derived:

$$W=W_m+\frac{(F-1)^4}{F} \tag{19}$$

$$W_m = C_0 + 4 \qquad (20)$$

Equations 11, 19 and 20 specify the response of the parallel series interstage network of Figs. 2 and 3 which has been adjusted to be maximally flat, in accordance with the conditions expressed in Equations 16, 17 and 18.

Approximate formulas, good for small fractional bandwidths, may be obtained for the bandwidth between the 3, 1, and 0.1 db down points of the response characteristic by considering in Equation 19 frequencies near $f_m$, the midband frequency.

$$\frac{\Delta f}{f_m} \cong W_m^{1/4} \text{ to the 3 db down points} \qquad (21)$$

$$\frac{\Delta f}{f_m} \cong .714 W_m^{1/4} \text{ to the 1 db down points} \qquad (22)$$

$$\frac{\Delta f}{f_m} \cong .390 W_m^{1/4} \text{ to the 0.1 db down points} \qquad (23)$$

Figure 5:
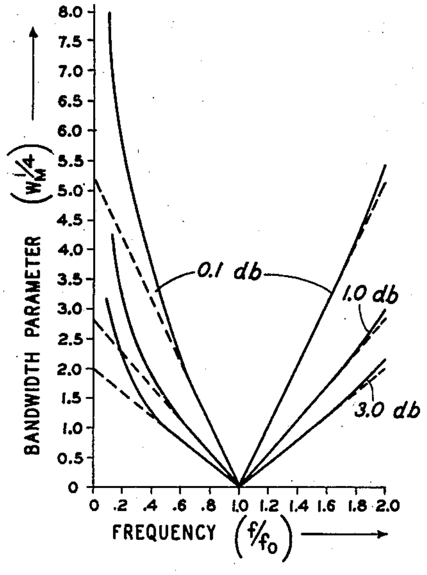

The plots of Fig. 5 illustrate the relationship between the fractional bandwidth, which is the ratio of bandwidth to midband frequency, and the bandwidth parameter $W_m^{1/4}$. The exact bandwidths, as computed from Equation 19, are shown by the solid lines; the approximate bandwidths given by Equations 21 through 23, strictly valid only for vanishingly small bandwidths, are shown by the dotted lines. These plots are for the maximally flat gain versus frequency conditions, and the bandwidths for the three sets of plots are determined by the upper and lower frequencies at which the gain drops off by 3.0 db, 1.0 db and 0.1 db from the gain at midband.

Equations 16, 17 and 18 express three constraints on the five network parameters, $s$, $p_1$, $p_2$, $h_1$, and $h_2$, which insure that the first three derivatives of the response with respect to frequency vanish. A fourth constraint is imposed when the bandwidth is selected; this, of course, also determines the gain. There is thus one variable left at our disposal, and this may be regarded as the distribution of the resistive loading between the parallel and series tuned sides of the network. If this is fixed, all of the network parameters are determined, and the component values of the circuit are determined in terms of the capacity $C_1$. In particular, $C_2$ is determined in terms of $C_1$.

Considering the case shown in Fig. 3 in which loading is included only on series side, Equations 16 through 18 may be substituted in Equations 3 through 8 to obtain the following design parameters:

$$p_2 = \frac{1}{4s-1}\left[1+\sqrt{5-1/s}\right] \qquad (24)$$

$$s > 0.25 \qquad k < 0.8660$$

$$p_1 = \frac{1}{p_2 s} \qquad (25)$$

$$h_2^2 = \frac{1}{2s^2[p_1+p_2-2]} \qquad (26)$$

$$W_m = 2[p_1+p_2-2][s^2p_2^2-1] \qquad (27)$$

Referring to Equation 11, and performing the impedance transformation mentioned above, the following expression for the gain of one stage of amplification is obtained:

$$A_m^2\left[\frac{E_{\text{out}}}{E_{\text{in}}}\right]_m^2 = \frac{g_m^2}{\omega_m^2 C_1 C_2}\cdot\frac{1-s}{sW_m} \qquad (28)$$

For gain at other points than midband, $W_m$ should be replaced by W in accordance with Equation 19.

The component values for the coupled coil representation of the network may now be determined. $L_{11}$ is no longer equal to $L_{22}$, since the required impedance transformation has been performed. We then have for any arbitrary capacitances $C_1$ and $C_2$ the following:

$$L_{11} = \frac{p_1}{\omega_m^2 C_1} \qquad (29)$$

$$L_{22} = \frac{p_2}{\omega_m^2 C_2} \qquad (30)$$

$$R_2 = \frac{p_2}{\omega_m C_2 h_2} \qquad (31)$$

Figure 6:
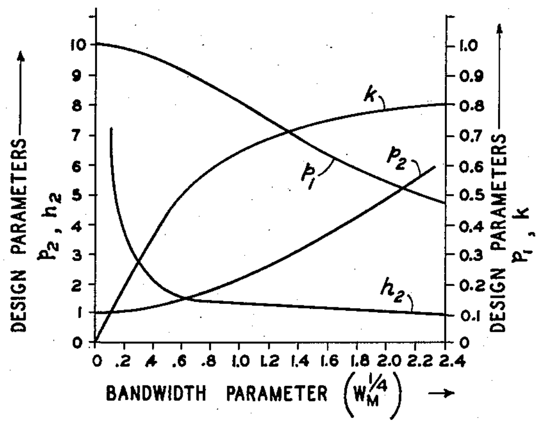

The design parameters given by Equations 24 through 27 are plotted against the bandwidth parameter in Fig. 6. It may be observed, therefore, that the selection of the bandwidth determines the values of the parameters $p_1$, $p_2$, $h$ and $k$. Once these values are fixed the components $L_{11}$, $L_{22}$, and $R_2$ may be determined by Equations 29 through 31.

Referring to Figs. 4–A and 4–B, the well-known transformation formulas between transformers and a T network of inductances will now be detailed:

$$L_{12} = k\sqrt{L_{11}L_{22}} \qquad (32)$$

$$L_1 = L_{11} - L_{12} \qquad (33)$$

$$L_2 = L_{22} - L_{12} \qquad (34)$$

In order for the network to be realizable as a T, it may be seen that $L_1$ and $L_2$ must be positive. This places a restriction on the allowed capacitance ratios for the various circuits which will be discussed in connection with Fig. 8. Once the bandwidth has been selected, the constants of the component elements of the circuit of Fig. 3 are now completely determinable.

It is emphasized, however, that although the transformation detailed above is well known per se, it is not considered obvious to use this T network of inductances in the circuital configurations of Figs. 2 and 3, for example. It is desirable to use a T network of inductances rather than a transformer in the present interstage coupling circuits, for several reasons. First, the output capacity of wiring associated with the amplifier tubes can be reduced through mounting one coil close to or within the tube as shown in Fig. 3. This decrease of output capacitance increases the figure of merit of the tube. A second reason is that the T network of inductances normally permits higher coupling factors than are possible with coupled coils. The separate adjustment of each of the three coils constitutes a further advantage of the T network over transformer coupling.

Figure 7:
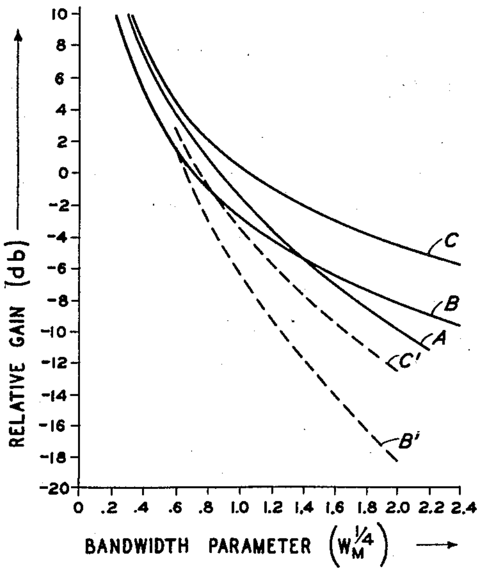
Figure 8:
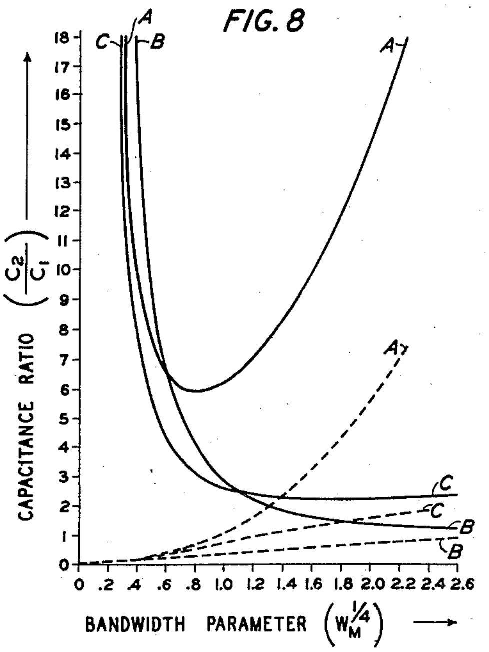

In Figs. 7 and 8 the properties of the present parallel-series interstage coupling network (curves labelled "A") are compared with parallel-parallel interstage coupling networks of the matched type (curves labelled B) and the mismatched type (plots labelled C). In Fig. 7 the gain of the different circuits is compared and is plotted against the bandwith parameter, as shown by the solid curves A. B and C. The dotted curves B′ and C′ will be discussed below.

Fig. 8 shows the maximum and minimum capacitance ratios which can be accommodated by the various circuits subject to the restriction that the coupled coils must be realizable as a T network of inductances. In each case the upper solid line curves A. B and C represent the upper capacitance limit while the lower dotted curves represent the lower limit of capacitance ratio. Note particularly that at relative bandwidths of 1 or greater (bandwidth ≧ midband frequency), neither of the parallel-parallel circuits is satisfactory for capacitance ratios as high as three. The present parallel-series circuit, however, is satisfactory for capacitance ratios up to six at a relative bandwidth of 1 and for even higher ratios at greater bandwidths.

If the capacity ratio is too great, it is possible to add extra capacity to the plate side of the network and to reduce the capacity ratio so that it falls within the bounds shown on Fig. 8. However, the gain is reduced by this process, as shown by Equation 28. The dotted curves B′ and C′ of Fig. 7 show the gain which the matched and mismatched parallel-parallel circuits would have if initially they had a capacity ratio equal to the maximum ratio which the new parallel-series network permits, and the additional capacity were added to the plate side of the network to bring the final capacity ratio for these parallel-parallel circuits within the limits shown on Fig. 8. These curves B′ and C′, when contrasted with the plot A, clearly illustrate the superiority of the present circuit.

In addition to the advantages noted above for the parallel-series intermediate frequency amplifier as compared with parallel-parallel arrangements, the position of the series resistance (61 in Fig. 3) yields several collateral useful results. First, the cathode of a vacuum tube, and its associated wiring have an effective inductance. A vacuum tube amplification stage with inductance in the cathode connection to the vacuum tube is equivalent to the same circuit without inductance, and a constant resistance in series with the grid. In the present circuit this effective resistance is absorbed in the much larger series grid loading resistance 61 of Fig. 3, for example. In the parallel-parallel circuit of Fig. 1, however, the presence of this effective series resistance may have the undesirable effects of reducing the gain and altering the gain versus frequency characteristic.

This adverse effect is accentuated in the parallel-parallel circuits by the use of a small resistance physically connected in series with and adjacent to the grid which is often employed to prevent oscillation which might otherwise result from feedback from the plate circuit. In the parallel-series network, however, the large series loading resistance provides even greater insurance against oscillation.

In the gain control of amplifiers of the type under consideration, it is customary to vary the grid bias, thereby varying the transconductance $g_m$ of the tubes. The effective series resistance reflected into the grid circuit by the cathode lead inductance, as mentioned above, is a function of the tube transconductance. Thus in the parallel-parallel circuits, the frequency response may be a function of the gain. In the parallel-series circuit, however, the reflected resistance is quite small relative to the series loading resistance, and therefore gain variations will not affect the frequency response appreciably. This means, for example, that in a parallel-series type amplifier employing automatic gain control, high and low level input pulses of the same shape will continue to have the same shape at the output of the amplifier.

Concerning the series loading of the secondary, it may be noted that the validity of the bandwidth analysis discussed in connection with Figs. 5 through 8 does not depend on locating the series resistance at the grid of the tube 32. For example, and as illustrated in Fig. 2, the resistance may be split up, with a portion of the resistance 43 located on each side of the coil 35. Alternatively, the entire resistance may be located on either side of the inductance 35. However, the preferred location of the series resistance is at the input to the grid of the tube, as shown at 61 in Fig. 4, principally because of the stability considerations mentioned hereinbefore.

In the present parallel-series circuits, the ratio of the series grid resistance $R_2$ to the input capacitive reactance $X_{C_2}$ of the following tube is a factor of considerable importance. The relationship between this ratio and the parameters $h_2$ and $p_2$, which are plotted in Fig. 6, is given by the following formula:

$$\frac{R_2}{X_{C_2}}=\frac{p_2}{h_2} \qquad (35)$$

From the plots of Fig. 6 it may be observed that the ratio varies from approximately 1/7 at narrow bandwidths ($W_m^{1/4}=0.1$, for example) to five or six to one at the widest bandwidth shown. This ratio is in contrast to the practice in employing "anti-sing" resistances, in which it is desirable for the resistance to have a negligibly small value as compared with the input capacitive reactance. Accordingly, the series resistance should be of a size at least of the same order of magnitude as the input capacitive reactance of the tube. Therefore, the series resistance should be greater than one-tenth of the input capactive reactance, and the ratio is preferably greater than one-half, at the broader bandwidths which are most suitable for the present interstage coupling network.

Fig. 9 is a five-stage amplifier which was designed and built to exemplify the principles of the invention. The first four tubes $V_1$ through $V_4$ have the following characteristics:

| | | |
|---|---|---|
| Input capacitance | micro-microfarads | 26 |
| Output capacitance | do | 4 |
| Ratio of $C_{in}/C_{out}$ | | 6.5 |
| $g_m$ (transconductance) | mho | .030 |

The output tube $V_5$ has the following characteristics:

| | | |
|---|---|---|
| Input capacitance | micro-microfarads | 22 |
| Output capacitance | do | 6 |
| Ratio of $C_{in}/C_{out}$ | | 3.67 |
| $g_m$ (transconductance) | mho | .028 |

In the design of the amplifier, a center frequency of 70 megacycles and a bandwidth of 77 megacycles to the 3 db down points (or 30 megacycles to the 0.1 db down points), for each amplification stage, was selected. Referring to Fig. 5, this corresponds to $W_m^{1/4}=1.1$.

The constants for interstage coupling circuits, which circuits are shown in heavy lines in Fig. 9, were calculated as set forth in the preceding paragraphs. In comparing the interstage circuits of Fig. 9 with the simplified circuit of Fig. 3, the coil 71 of Fig. 9 corresponds to the coil 56 of Fig. 3, inductance 72 corresponds to coil 55, and the coil 73 and series resistance 74 of Fig. 9 correspond to components 57 and 61 of Fig. 3. The exact values calculated for these critical elements of Fig. 9 are as follows:

| | | |
|---|---|---|
| Inductance **71** | microhenries | .543 |
| Inductance **72** | do | .461 |
| Inductance **73** | do | .011 |
| Resistance **74** | ohms | 172 |

The values of the interstage coupling elements between the tubes $V_4$ and $V_5$ are somewhat different from the values listed above, because of the different input capacitance of the tube $V_5$. The calculated values for coils 75, 76 and 77 are .503, .501 and .057 microhenry, respectively, and the resistance 78 is 203 ohms.

Suitable networks are also provided for coupling from the 75 ohm input coaxial line 81 to the 75 ohm output coaxial line 82. The values of the critical components in these networks are listed below:

| | | |
|---|---|---|
| Capacitance **82** | micro-microfarads | 23.7 |
| Inductance **83** | microhenries | .189 |
| Inductance **84** | do | .036 |
| Inductance **85** | do | .162 |
| Resistance **86** | ohms | 112 |
| Resistance **87** | do | 484 |
| Inductance **88** | microhenries | .339 |
| Inductance **89** | do | .521 |
| Inductance **90** | do | .012 |
| Capacitance **91** | micro-microfarads | 23.7 |

The values of the balance of the components are not, in general, highly critical, but will be set forth briefly for purposes of completeness. The cathode resistances 93 are 510 ohms, and the cathode resistance 94 is 330 ohms. The bypass condensers 95 have a value of 1000 micro-microfarads, and the elements 96 are 1500 micro-microfarad bypass condensers. The decoupling inductances 97 may be approximately 5 microhenries, and are wound on a 330 ohm one-half watt resistor. For proper operation of the tubes $V_1$ through $V_5$ it is desirable to employ relatively high cathode bias, and maintain the grids at a slightly lower positive voltage. The positive grid biasing circuit includes the 68,000 ohm resistance 98, and 5600 ohm resistance 99, and the 5100 ohm resistances 102.

Figure 10 is a plot of the gain versus frequency characteristic of the amplifier of Fig. 9. The actual gain of the amplifier is 64 db and it has a bandwidth of approximately 27 megacycles in which the gain variations are less than 0.1 db. Employing $W_m^{1/4}$ equal to 1.1, a bandwidth of 30 megacycles to the 0.1 db down points was anticipated for each coupling network. With six amplification stages each including a coupling network, the cumulative drop off at the ends of a 30 megacycle band would be substantially greater than ½ db. However, perturbation analysis indicates that very slight changes in the inductance values will reduce the drop off at the ends of the band without changing the central portion of the response characteristic substantially from the maximally flat condition. This accounts for the good gain versus frequency characteristic plotted in Fig. 10.

It is to be understood that the above-described arrangements are illustrative of the application of the principles of the invention. Numerous other arrangements may be devised by those skilled in the art without departing from the spirit and scope of the invention.

What is claimed is:

1. In a circuit for amplifying high frequency signals over a broad band centered at a predetermined frequency, a first tube having a predetermined output capacitance, a second tube having an input capacitance which is more than three times as great as said predetermined output capacitance, said second tube also having a particular input capacitive reactance at said predetermined frequency, interstage coupling means between said two tubes for providing a pass band which is greater than one half of said predetermined frequency, said coupling means including at least a first tuned circuit, said first tuned circuit being coupled to the output of said first tube, said coupling means having a first output terminal at which output signals are developed, and a second output terminal at radio frequency ground potential, and a resistance connected between said first output terminal and the grid of said second tube, said resistance being greater than three halves the product of the normalized bandwidth times the capacitive reactance and less than three times this product.

2. In a circuit for amplifying high frequency signals over a broad band centered at a predetermined frequency, first and second tubes having a predetermined output capacitance, said tubes having an input capacitance which is more than three times as great as said predetermined output capacitance, said tubes also having a particular input capacitive reactance at said predetermined frequency, and an interstage radio frequency signal coupling network consisting of first, second, and third branch circuits connected to a common point, the other terminals of said first, second, and third branch circuits being connected respectively to the plate of said first tube, a radio frequency ground point and the grid of said second tube, said first branch circuit including an inductance, said second branch circuit consisting of an inductance, and said third branch circuit consisting of resistance and inductance means connected in series, said resistance means having an impedance which is at least equal to one half of said capacitive reactance.

3. In an amplifier for high frequency signals over a broad band centered at a predetermined frequency, a first vacuum tube having an output capacitance $C_1$, a second vacuum tube having an input capacitance $C_2$, an interstage coupling network including first, second, and third branch circuits each having one terminal connected to a common point, each branch circuit including an inductance, the other terminal of said first branch circuit including inductance $L_1$ connected to the plate of said first vacuum tube, the other terminal of said second branch circuit including inductance $L_{12}$ connected to a radio frequency ground point, the other terminal of said third branch circuit including inductance $L_2$ connected to the grid of said second tube, and a resistance R in said third branch circuit connected in series with said inductance $L_2$, wherein the values of said resistance R and said inductances $L_1$, $L_2$, and $L_{12}$ are substantially those given by the following equations:

$$R=\frac{p_2}{\omega_m C_2 h_2}$$

$$L_{12}=k\sqrt{L_{11}L_{22}}$$

$$L_1=L_{11}-L_{12}$$

$$L_2=L_{22}-L_{12}$$

$$L_{11}=\frac{p_1}{\omega_m^2 C_1}$$

$$L_{22}=\frac{p_2}{\omega_m^2 C_2}$$

in which $L_{12}$ is the mutual inductance coupling said first and third branches, $L_{11}$ and $L_{22}$ are design parameters determined by the selected bandwidth parameter, $k$ is a coupling coefficient, $\omega_m$ is the angular frequency at the center of the passband of the amplifier, and the values of $p_1$, $p_2$, and $h_2$ representing design parameters determined by the selected bandwidth parameter are obtained by the following equations:

$$p_2=\frac{1}{4s-1}[1+\sqrt{5-1/s}]$$

$$s>0.25 \qquad k<0.8660$$

$$p_1=\frac{1}{p_2 s}$$

$$h_2^2=\frac{1}{2s^2[p_1+p_2-2]}$$

$$W_m=2[p_1+p_2-2][s^2p_2^2-1]$$

where $s$ is the leakage coefficient, and $W_m$ is the fourth power of the normalized bandwidth.

4. In a circuit for amplifying high frequency signals over a broad band centered at a predetermined frequency, a first tube having a predetermined output capacitance $C_1$, a second tube having an input capacitance $C_2$ which is more than three times as great as said predetermined output capacitance, interstage coupling means between said two tubes for providing a passband which is greater than one half of said predetermined frequency, said coupling means including first and second tuned circuits coupled respectively to the output of said first tube and the input of said second tube, said first and second tuned circuits having mutual inductance coupling therebetween, and a resistance R included in said second tuned circuit in series with the grid of said second tube, wherein the value of said resistance R and the constants of said first and second tuned circuits are substantially those given by the following equations:

$$R=\frac{p_2}{\omega_m C_2 h_2}$$

$$L_{12}=k\sqrt{L_{11}L_{22}}$$

$$L_{11}=\frac{p_1}{\omega_m^2 C_1}$$

$$L_{22}=\frac{p_2}{\omega_m^2 C_2}$$

in which $L_{12}$ is the mutual inductance coupling the two tuned circuits, $L_{11}$ and $L_{22}$ are the self-inductances of the first and second tuned circuits, respectively, $k$ is a coupling coefficient, $\omega_m$ is the angular frequency at the center of the passband of the amplifier, and the values of $p_1$, $p_2$, and $h_2$ are determined by the following equations:

$$p_2=\frac{1}{4s-1}[1+\sqrt{5-1/s}]$$

$$s>0.25 \qquad k<0.8660$$

$$p_1=\frac{1}{p_2 s}$$

$$h_2^2=\frac{1}{2s^2[p_1+p_2-2]}$$

$$W_m=2[p_1+p_2-2][s^2p_2^2-1]$$

where $s$ is the leakage coefficient, and $W_m$ is the fourth power of the normalized bandwidth.

5. In a circuit for amplifying high frequency signals over a broad band centered at a predetermined frequency, first and second tubes having a predetermined output capacitance, said tubes having an input capacitance which is more than three times as great as said predetermined output capacitance, said tubes also having a particular input capacitive reactance at said predetermined frequency; and interstage signal coupling means for providing a gain versus frequency characteristic in which the first and second derivatives of the gain versus frequency characteristic are substantially equal to zero at said predetermined frequency and a passband greater than one-half said predetermined frequency, said interstage signal coupling means consisting only of first, second, and third branch circuits connected to a common point and connected respectively to the plate of said first tube, a radio frequency ground point, and the grid of said second tube, the first of said branch circuits consisting only of an inductance, the second of said branch circuits which is connected to a radio frequency ground point consisting only of an inductance, and the third of said branch circuits consisting only of series connected inductance and resistance means, said resistance means having an impedance which is at least equal to one half of said capacitive reactance.

6. In a circuit for amplifying high frequency signals over a broad band centered at a predetermined frequency, first and second tubes having a predetermined output capacitance, said tubes having an input capacitance which is more than three times as great as said predetermined output capacitance, said tubes also having a particular input capacitive reactance at said predetermined frequency; and interstage radio frequency signal coupling means for providing a gain versus frequency characteristic in which the first and second derivatives of the gain versus frequency characteristic are substantially equal to zero at said predetermined frequency, said interstage signal coupling means consisting only of first, second, and third branch circuits connected to a common point and connected respectively to the plate of said first tube, a radio frequency ground point, and the grid of said second tube, the first of said circuits including an inductance, the second of said circuits which is connected to a radio frequency ground point consisting only of an inductance, and the third of said circuits consisting only of series connected inductance and resistance means, said resistance means having an impedance which is at least equal to one half of said capacitive reactance.

References Cited in the file of this patent

UNITED STATES PATENTS

| | | |
|---|---|---|
| 2,023,057 | Schweikert | Dec. 3, 1935 |
| 2,025,128 | Rust | Dec. 24, 1935 |
| 2,316,883 | Mountjoy | Apr. 20, 1943 |
| 2,397,850 | Ford | Apr. 2, 1946 |
| 2,404,270 | Bradley | July 16, 1946 |
| 2,577,746 | Faust et al. | Dec. 11, 1951 |
| 2,794,865 | Black et al. | June 4, 1957 |

FOREIGN PATENTS

| | | |
|---|---|---|
| 668,974 | Great Britain | Mar. 26, 1952 |